June 10, 1941.   W. R. WILEY   2,245,375

CLIP

Filed Dec. 5, 1939

INVENTOR
William R. Wiley.
BY
Harness, Dickey & Pierce.
ATTORNEYS.

Patented June 10, 1941

2,245,375

UNITED STATES PATENT OFFICE 2,245,375

CLIP

William R. Wiley, Birmingham, Mich.

Application December 5, 1939, Serial No. 307,647

6 Claims. (Cl. 189—88)

The present invention relates to improved clips adapted for use in securing moldings to panel members, such as automobile body panels.

One of the primary objects of the present invention is to provide improved clips of the type mentioned which are leak-proof in character.

Another object of the invention is to provide improved clips of the type mentioned in which the clips are formed of a resilient material and in which the bases of the clips have resilient means which snap into engagement with a panel to which the clips are attached for securing the clips to the panel.

Other objects of the invention will become apparent from the following specification, the drawing relating thereto, and from the claims hereinafter set forth.

In the drawing, in which like numerals are used to designate like parts in the several views throughout:

Figure 1:
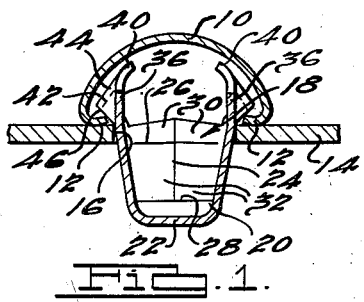
Figure 1 is a fragmentary, vertical cross-sectional view illustrating a molding attached to a supporting panel by means of a clip embodying features of the present invention.
Figure 2:
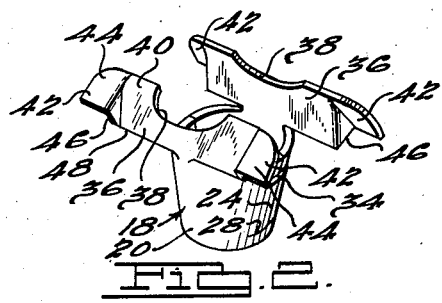
Fig. 2 is a perspective view of the clip illustrated in Fig. 1.
Figure 3:
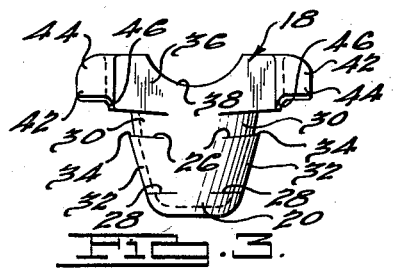
Fig. 3 is a side elevational view of the clip illustrated in Fig. 1.
Figure 4:
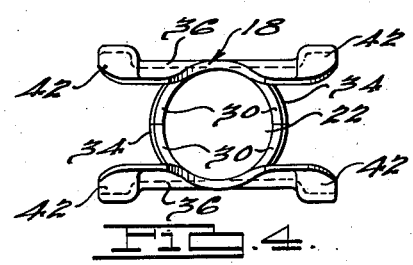
Fig. 4 is a top plan view of the clip illustrated in Fig. 1.

Referring to the drawing, and referring particularly to Figs. 1 through 4 thereof, a sheet metal channel shaped molding strip 10 is illustrated having inturned edges 12. It is, of course, to be understood that the strip 10 is elongated in shape and is adapted to be attached to a sheet metal panel 14, such as one of the body panels of an automobile, at spaced intervals along its length. The panel 14 is provided with a plurality of spaced openings or apertures 16, which in the embodiment illustrated are circular, along the line which the molding strip 10 is designed to occupy when in position.

The clips forming the subject matter of the present invention are preferably formed from a single integral sheet metal stamping made from relatively high carbon steel, which, after being formed, is heat treated or otherwise tempered in order that it may have the resiliency and elasticity that clips of the present type require.

The molding 10 is adapted to be secured to the panel 14 by means of clips, generally indicated at 18, which engage the molding strip 10 and engage the panel 14 through the openings or apertures 16. Each clip 18 comprises a cup-shaped base 20 having the lower end 22 thereof closed. The base 20 has upwardly and outwardly tapered side walls. The base 20 is split or slit along a pair of diametrically opposed lines 24; and each of such lines 24 are crossed by upper and lower splits or slits 26 and 28, respectively. Each of these slits cross their respective vertical slits 24, and the ends of the slits 26 and 28 are substantially equally spaced from their respective vertical slits 24. The top splits 26 are spaced inwardly from the upper edge of the base 20 to provide resilient portions 30. The lower splits 28 are located at the bottoms of their respective splits 24, and are spaced upwardly from the bottom 22 of the base. There are thus provided a pair of resilient wing portions 32.

The portion of the base 20 in the region of the resilient portions 30 is substantially circular in cross-section, so that it is complementary in shape to the shape of the aperture 16. That portion of the base in the region of the resilient wing portions 32 is deformed into a generally elliptical shape, so that the upper edges of the wing portions 32 form outwardly projecting shoulders or abutments 34. The manner in which the base portion 20 passes through aperture 16 and engages the panel to secure the clip therein, will be described in detail hereinafter.

A pair of upstanding, elongated attaching elements 36 are oppositely disposed and are integrally formed with the base portion 20 adjacent the upper edge thereof. The portions 36 are formed with semi-circular cut-away portions 38 intermediate the ends thereof, and the upper edges are curved upwardly and inwardly, as indicated at 40. The ends of elements 36 are then bent outwardly to provide ear portions 42. Each of such ear portions 42 thus forms an upper cam surface 44, which slopes outwardly and downwardly, and an under cam edge 46, which slopes downwardly and inwardly.

The under edge 48 of each of the elements 36 is adapted to bear against the top surface of panel 14 when the base 22 is inserted through aperture 20. The distance between the under edge 48 and the slits 26 is substantially equal to the thickness of the panel 14; so that it will be seen that when the base 20 is inserted through the aperture 16 the wing portions 32 are resiliently urged inwardly as the sloping walls thereof engage the edge of the aperture 16. When the clip reaches its proper position within the aperture, or when the under edges 48 engage the top surface of panel 14, the resilient wing portions 32 will then snap outwardly so that the shoulders 34 engage the undersurface of panel 14. The clip is then securely fixed with respect to the supporting panel 14.

To secure the molding strip 10 to the panel through the clip, the molding 10, which is formed of metal and is resilient, may be placed above the cam surfaces 44 of the clip and such cam surfaces will force the facing edges of flanges 12 outwardly so that such edges will snap over the ears 42. The cam edges 46 will thus engage the facing edges of flanges 12, and urge the molding 10 against the panel 14.

The edge of aperture 16 is tightly engaged by that portion of the base 20 in the region of resilient portions 30, so that a leak-proof construction is provided.

Figure 5:
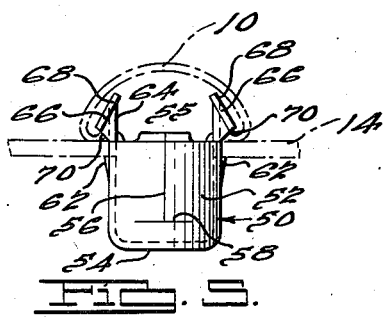
Fig. 5 is an end elevational view of another form of clip construction embodying features of the present invention, in which a molding and a supporting panel to which the molding is attached are illustrated in broken lines.
Figure 6:
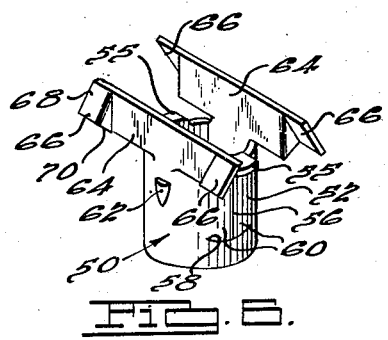
Fig. 6 is a perspective view of the clip illustrated in Fig. 5.
Figure 7:
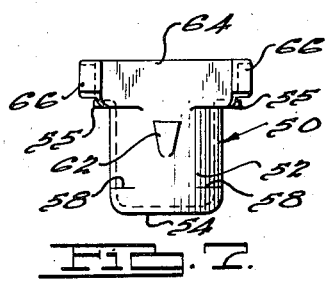
Fig. 7 is a side elevational view of the clip illustrated in Fig. 5.
Figure 8:
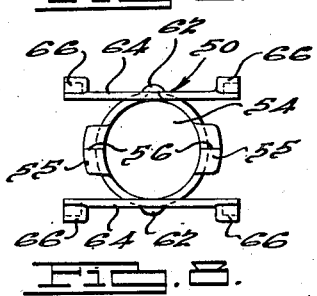
Fig. 8 is a top plan view of the clip illustrated in Fig. 5.

Referring to Figs. 5 through 8, another form of clip construction is generally indicated at 50, which embodies features of the present invention. The clip 50 is formed of the same material as that mentioned above, and comprises a cup-shaped base portion 52, which is generally cylindrical in shape and which has a closed bottom 54. The base 52 is provided with a pair of integral, outwardly extending lugs 55 on the top edge thereof, which are adapted to bear against the top surface of supporting panel 14 in a manner that will be described in more detail hereinafter. The base 52 is also provided with a pair of diametrically opposed longitudinally extending splits or slits 56, through the wall thereof, which also cut through the lugs 55 at substantially the main points thereon. The split 56 terminates in spaced relation to the bottom 54, and cross splits or slits 58 are also provided through the wall of the base 52 adjacent the lower end of each slit 56 with the ends of the slits 58 equally spaced from their respective slits 56. The slits 56 and 58 thus form resilient portions 60 in the base 52, and such portions may be deformed outwardly slightly so that these portions resiliently bear against the edge of aperture 16 when the clips are positioned therein.

The base 52 is also provided with a pair of diametrically opposed outwardly struck tabs 62, which are preferably disposed at substantially 90° from the projections 55. Tabs 62 are resilient, and the upper edges thereof are spaced from the under edges of portions 55 a distance substantially equal to that of the thickness of panel 14. The radii on the underside of portions 55 cause the clips to be drawn upwardly so that the tabs 62 abut against the panel. It will thus be seen that when the base 52 is inserted through aperture 16, which is complementary in shape to the shape of base 52, the tabs 62 will first be resiliently urged inwardly; and when the clip reaches such a position that the under surfaces of projections 55 bear against the top surface of panel 14, the tabs 62 will then spring outwardly so that the upper edges thereof engage the surface of panel 14. The clip is thus securely fixed to the panel.

The clip 50 is also formed with a pair of upstanding elongated molding attaching elements 64, which are oppositely disposed and are integrally formed with the base 52 adjacent the upper edge thereof. The elements 64 are generally rectangular in form, and have the ends thereof bent outwardly to provide ear portions 66, which correspond to the ear portions 42 above described. The ear portions 66 form upper cam surfaces 68, which slope outwardly and downwardly, and under cam surfaces 70, which slope downwardly and inwardly. The molding 10 is applied to the attaching elements and engages the cam surfaces 68 and cam edges 70 in the same manner as that described above for the corresponding elements in clip 18.

Formal changes may be made in the specific embodiments of the invention described without departing from the spirit and substance of the invention, the scope of which is commensurate with the appended claims.

What is claimed is:

1. A clip construction adapted to secure a channel shaped molding member to a panel having an aperture therein comprising a sheet metal member formed with a cup shaped base portion, said base portion having longitudinal and transverse slits formed therein so arranged as to provide a pair of resilient wing portions on one side of said base and another pair of resilient wing portions diametrically opposed to said first named wing portions, the upper edge of said wing portions being in spaced relation to the top edge of said base and being shaped to provide panel engaging means, and elongated molding engaging elements oppositely disposed and formed integral with said base portion, said elements having portions thereon adapted to engage said molding member.

2. A clip construction adapted to secure a channel shaped molding member to a panel having an aperture therein comprising a sheet metal member formed with a tapered cup shaped base portion, said base portion having longitudinal and transverse slits formed therein so arranged as to provide a pair of resilient wing portions on one side of said base and another pair of resilient wing portions diametrically opposed to said first named wing portions, the upper edge of said wing portions being in spaced relation to the top edge of said base and being shaped to provide panel engaging means, and elongated molding engaging elements oppositely disposed and formed integral with said base portion, said elements having portions thereon adapted to engage said molding member, the distance between the upper edge of said resilient portions and the under edge of said molding engaging elements being substantially equal to the thickness of said panel.

3. A clip construction adapted to secure a channel shaped molding member to a panel having an aperture therein comprising a sheet metal member formed with a cup-shaped base portion, diametrically opposed outwardly extending projections formed in the upper edge of said base portion, diametrically opposed outstruck resilient tabs formed in said base portion spaced from the under surface of said projections, and molding engaging elements oppositely disposed and formed integral with said base portion.

4. A clip construction adapted to secure a channel shaped molding member to a panel having an aperture therein comprising a sheet metal member formed with a cup-shaped base portion, diametrically opposed outwardly extending projections formed integral with said base portion adjacent the upper edge thereof, longitudinally extending slits formed through the wall of said base portion and through said projections, another slit formed at substantially right angles to each of said first named slits adjacent the lower ends thereof and spaced from the bottom of said base portion, thereby providing resilient portions in said base portion, a pair of diametrically opposed outstruck resilient tabs formed in said base portion between said projections, the upper edges of said outstruck tabs being spaced from the under surfaces of said projections a distance substantially equal to the thickness of said panel, and elongated molding engaging elements oppositely disposed and formed integral with said base portion, said elements having portions thereon adapted to engage said molding member.

5. In an assembly comprising a channel-shaped molding member having inturned flanges and an apertured panel, a clip for securing said molding to said panel, said clip having a cup-shaped base portion extending through the aperture in said panel and being complementary in shape thereto, means on the cup-shape portion of said clip for engaging one side of said panel adjacent said aperture, resilient means also on the base portion of said clip adapted to engage the other side of said panel adjacent said aperture, and molding engagement means formed integral with said base portion adapted to secure said molding strip in predetermined position with respect to said panel.

6. In an assembly including a channel-shaped molding strip having inturned flanges and a supporting panel having an aperture therein, a clip for securing said molding in fixed position with respect to said panel, said clip comprising a cup-shaped base portion extending through said aperture and generally complementary in shape thereto, means on said cup-shaped base portion adapted to engage one side of said panel adjacent said aperture, resilient snap acting means formed on said base portion adapted to engage the other side of said panel adjacent said aperture, said last mentioned means being so constructed as to be resiliently urged inwardly as said cup-shaped base portion is inserted in said aperture and then snap outwardly into engagement with said panel when said clip reaches its fixed position with respect to said panel, and molding engaging means formed integral with said base portion for anchoring said molding strip in position with respect to said panel.

WILLIAM R. WILEY.